(12) United States Patent
Oikawa et al.

(10) Patent No.: US 7,925,123 B2
(45) Date of Patent: Apr. 12, 2011

(54) OPTICAL CONTROL DEVICE

(75) Inventors: Satoshi Oikawa, Chiyoda-ku (JP);
Junichiro Ichikawa, Chiyoda-ku (JP);
Yuhki Kinpara, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 12/450,369

(22) PCT Filed: Mar. 28, 2008

(86) PCT No.: PCT/JP2008/056062
§ 371 (c)(1),
(2), (4) Date: Sep. 23, 2009

(87) PCT Pub. No.: WO2008/120707
PCT Pub. Date: Oct. 9, 2008

(65) Prior Publication Data
US 2010/0034496 A1   Feb. 11, 2010

(30) Foreign Application Priority Data

Mar. 30, 2007   (JP) ................ 2007-092749

(51) Int. Cl.
*G02F 1/01* (2006.01)
*G02F 1/035* (2006.01)
*G02F 1/295* (2006.01)
*G02B 6/10* (2006.01)

(52) U.S. Cl. ............. 385/2; 385/1; 385/8; 385/130

(58) Field of Classification Search .......... None
See application file for complete search history.

(56) References Cited

U.S. PATENT DOCUMENTS

| 5,408,566 A | 4/1995 | Eda et al. |
| 5,790,719 A | 8/1998 | Mitomi et al. |
| 6,580,843 B2 | 6/2003 | Doi et al. |

(Continued)

FOREIGN PATENT DOCUMENTS

DE   196 49 441 A1   6/1997

(Continued)

OTHER PUBLICATIONS

International Preliminary Report on Patentability for International Application No. PCT/JP2008/056062, issued Oct. 13, 2009.

*Primary Examiner* — Charlie Peng
*Assistant Examiner* — Mary A El-Shammaa
(74) *Attorney, Agent, or Firm* — Oliff & Berridge, PLC

(57) ABSTRACT

A light control element is provided with a thin board having electro-optical effects; an optical waveguide formed on the thin board; and a control electrode for controlling light that passes through the optical waveguide. The light control element performs speed matching between a microwave signal applied to the control electrode and the light, impedance matching of the microwaves, reduction of a driving voltage and high speed operation. In the control electrode of the light control element, a signal electrode and a grounding electrode are arranged on an upper side of the thin board, and on a lower side of the thin board, a second electrode including the grounding electrode is arranged, through a low refractive index layer entirely formed in the length direction of the signal electrode, with a width wider than that of the signal electrode.

17 Claims, 11 Drawing Sheets

U.S. PATENT DOCUMENTS

| | | |
|---|---|---|
| 2003/0044100 A1 | 3/2003 | Kondo et al. |
| 2003/0138180 A1 | 7/2003 | Kondo et al. |
| 2004/0264832 A1* | 12/2004 | Kondo et al. .................. 385/14 |
| 2006/0029319 A1 | 2/2006 | Sugiyama |

FOREIGN PATENT DOCUMENTS

| | | |
|---|---|---|
| EP | 1 291 706 A2 | 3/2003 |
| EP | 1 315 021 A2 | 5/2003 |
| EP | 1 455 219 A1 | 9/2004 |
| JP | A-64-18121 | 1/1989 |
| JP | A-5-93892 | 4/1993 |
| JP | A-6-289341 | 10/1994 |
| JP | A-10-39266 | 2/1998 |
| JP | A-2003-156723 | 5/2003 |
| JP | A-2003-215519 | 7/2003 |
| JP | A-2004-4589 | 1/2004 |
| JP | B2-3638300 | 4/2005 |
| JP | A-2006-47746 | 2/2006 |
| JP | A-2006-243327 | 9/2006 |
| WO | WO 2007/114367 A1 | 10/2007 |

* cited by examiner

OPTICAL CONTROL DEVICE

TECHNICAL FIELD

The present invention relates to an optical control device and, particularly, to an optical control device which includes a sheet-like substrate having an electro-optical effect and having a thickness of 10 μm or less, an optical waveguide formed in the sheet-like substrate, and a control electrode for controlling light which passes through the optical waveguide.

BACKGROUND ART

Conventionally, in the field of optical communication or optical measurement, various optical control devices such as a waveguide type optical modulator and a waveguide type optical switch, where an optical waveguide and a control electrode are formed on a substrate having an electro-optical effect, have become commercially available. Many of the optical control devices which are currently being used are configured to include an optical waveguide 2, a signal electrode 4 and a ground electrode 5 which are formed on an electro-optical crystal substrate 1 having a thickness of about 0.5 to 1 mm, as illustrated in FIG. 1. FIG. 1 illustrates an example of an optical modulator that uses a Z-cut $LiNbO_3$ substrate, in which reference numeral 3 indicates a buffer layer such as $SiO_2$ film.

Specifically, in the waveguide type optical modulator, a microwave signal is applied to the control electrode in order to control and modulate an optical wave propagating in the optical waveguide. Therefore, there is a need for achieving an impedance matching between the control electrode in the optical modulator and a signal path, such as a coaxial cable which introduces microwaves into the optical modulator, in order to allow the microwave to propagate effectively through the control electrode. For this reason, as illustrated in FIG. 1, a type of control electrode where a strip-shaped signal electrode 4 is interposed between ground electrodes 5 so that a so-called coplanar control electrode has been used.

However, in the case of the coplanar control electrode, since an external electric field does not operate efficiently in a direction (corresponding to a vertical direction in the case of the Z-cut substrate illustrated in FIG. 1) where the efficiency of the electro-optical effect of the substrate 1 is high, a larger voltage is required in order to obtain a required optical modulation degree. Concretely, when a $LiNbO_3$ substrate (hereinafter referred to as an "LN substrate") is used and an electrode length along the optical waveguide is 1 cm, a half-wavelength voltage of about 10 to 15 V is required.

As illustrated in FIG. 2, Patent Document 1 discloses a configuration in which the optical waveguide is formed of a ridged waveguide 20, and the ground electrodes 5, 51, and 52 are disposed closer to the signal electrodes 4 and 41 in order to enhance an optical confinement factor of the optical waveguide and to more efficiently apply an electric field generated by the control electrode to the optical waveguide. According to this configuration, it is possible to realize a reduction in driving voltage to some degree but it is essential to reduce the driving voltage much more in order to realize a high-speed modulation in a high frequency band.

In addition, as illustrated in FIG. 3, Patent Document 2 discloses that the substrate is interposed between the control electrodes, and the electric field is applied in a direction (corresponding to a vertical direction in the case of the Z-cut substrate illustrated in FIG. 3) where the efficiency of the electro-optical effect is high. Moreover, the optical modulator illustrated in FIG. 3 polarizes reversely the substrate having the electro-optical effect, and forms substrate regions 10 and 11 in which the respective spontaneous polarization directions (the directions of arrows in FIG. 3) are different from each other, and the optical waveguide 2 is formed in each of the substrate regions. When the electric field is applied to each optical waveguide by the common signal electrode 42 and the ground electrode 53, it is possible to generate a phase change for each optical waveguide such that the phase change of one optical waveguide is different from that of another optical waveguide. Therefore, it is possible to reduce the driving voltage much more.

However, in the electrode structure illustrated in FIG. 3, the refractive index of the microwave becomes high, and thus it is difficult to realize a velocity matching between the optical wave which is propagating through the optical waveguide and the microwave which is a modulation signal. Moreover, since the impedance is reduced to the contrary, there is the drawback in that it is difficult to achieve the impedance matching with the signal path of the microwave.

On the other hand, in the following Patent Document 3 or 4, the optical waveguide and a modulating electrode are formed integrally in a very thin substrate which has a thickness of 30 μm or less (the substrate will be referred to as a "sheet-like substrate") and another substrate which has a lower dielectric constant than that of the sheet-like substrate is bonded to the sheet-like substrate, thereby lowering an effective refractive index with respect to the microwave and achieving the velocity matching between the microwave and the optical wave.

However, even when the control electrode having the structure as illustrated in FIGS. 1 to 3 is formed in the optical modulator that uses such a sheet-like substrate, the above-mentioned problems still have fundamentally not been resolved. When the substrate is interposed between the control electrodes illustrated in FIG. 3, the refractive index of the microwave tends to decrease if the thickness of the substrate is thin, but it is difficult to realize the velocity matching between the optical wave and the microwave. Even when it depends on the width of the electrode, when a sheet-like substrate made of LN is used for example, the effective refractive index is about 5, which is far lower than an optimal value of 2.14. On the other hand, the impedance tends to decrease as the substrate becomes thinner, which causes a mismatching in impedance to be large.

Patent Document 1: U.S. Pat. No. 6,580,843
Patent Document 2: Japanese Patent No. 3638300
Patent Document 3: JP-A 64-018121 (KOKAI)
Patent Document 4: JP-A 2003-215519 (KOKAI)
Patent Document 5: JP-A 6-289341 (KOKAI)

DISCLOSURE OF INVENTION

Problems to be Solved by the Invention

The present invention is directed to solve such problems and an object of the present invention is to provide an optical control device capable not only of achieving a velocity matching between a microwave and an optical wave and an impedance matching of the microwave, but also achieving a reduction in driving voltage.

Another object of the present invention is to provide an optical control device which can operate stably and suppress a rise in temperature of the optical control device owing to the reduction in driving voltage, and further to provide the optical control device which can use a low-driving-voltage driving device which is inexpensive.

Means for Solving the Problems

In order to solve the above-mentioned problems, according to the invention of claim 1, there is provided an optical control device comprising: a sheet-like substrate which has an electro-optical effect and has a thickness of 10 μM or less; an optical waveguide formed on the sheet-like substrate; and a control electrode for controlling light passing through the optical waveguide, wherein the control electrode is comprised of a first electrode and a second electrode which are arranged so as to interpose the sheet-like substrate such that the first electrode includes a coplanar electrode which is composed of at least a signal electrode and a ground electrode and the second electrode is configured to include at least a ground electrode so as to apply an electric field to the optical waveguide in cooperation with the signal electrode of the first electrode; wherein a low dielectric constant layer, which has a width at least larger than that of the signal electrode of the first electrode and is formed at least over an entire length of the signal electrode, is formed on a lower portion of the sheet-like substrate.

The term "coplanar electrode" as used in the present invention means a configuration such that a signal electrode which is interposed between ground electrodes. For example, the coplanar electrode includes a structure where the signal electrode and the ground electrode are arranged at equal intervals or different intervals, a structure where the ground electrode is disposed in the side of on one side of the signal electrode, a structure where a plurality of signal electrodes are interposed between a pair of ground electrodes, and a structure where the ground electrodes are additionally disposed between the corresponding ones of a plurality of signal electrodes.

According to the invention of claim 2, the optical control device according to claim 1 is characterized in that the low dielectric constant layer is uniformly formed between the sheet-like substrate and the second electrode.

According to the invention of claim 3, the optical control device according to claim 1 is characterized in that the low dielectric constant layer is formed to be embedded in the ground electrode of the second electrode.

According to the invention of claim 4, the optical control device according to any one of claims 1 to 3 is characterized in that the low dielectric constant layer includes an air layer.

According to the invention of claim 5, the optical control device according to any one of claims 1 to 3 is characterized in that the low dielectric constant layer includes a resin layer.

According to the invention of claim 6, the optical control device according to any one of claims 1 to 5 is characterized in that the optical waveguide is a ridged optical waveguide.

According to the invention of claim 7, the optical control device according to any one of claims 1 to 6 is characterized in that a buffer layer is formed at least between the sheet-like substrate and the first electrode.

According to the invention of claim 8, the optical control device according to any one of claims 1 to 6 is characterized in that in the first electrode and the second electrode, the signal electrode and the ground electrode are configured by either a transparent electrode or an electrode where a transparent electrode is disposed on the sheet-like substrate.

According to the invention of claim 9, the optical control device according to any one of claims 6 to 8 is characterized in that a low dielectric constant film is filled in recesses which are disposed on at least both sides of the ridged waveguide.

According to the invention of claim 10, the optical control device according to any one of claims 1 to 9 is characterized in that a spontaneous polarization of the sheet-like substrate including at least a portion of the optical waveguide is reversed.

According to the invention of claim 11, the optical control device according to any one of claims 1 to 10 is characterized in that a relation of $d2<\in_2/\in_1 \times d1$ is satisfied, where $\in_2$ is a dielectric constant of the low dielectric constant layer, d2 is a thickness of the low dielectric constant layer, $\in_1$ is a dielectric constant of the sheet-like substrate, and d1 is a thickness of the sheet-like substrate.

Effects of the Invention

According to the invention of Claim 1, the optical control device comprises the sheet-like substrate which has an electro-optical effect and has a thickness of 10 μm or less; the optical waveguide formed on the sheet-like substrate; and the control electrode for controlling light passing through the optical waveguide. The control electrode is comprised of a first electrode and a second electrode which are arranged so as to interpose the sheet-like substrate. The first electrode includes a coplanar electrode which is composed of at least a signal electrode and a ground electrode. The second electrode is configured to include at least a ground electrode so as to apply an electric field to the optical waveguide in cooperation with the signal electrode of the first electrode. Therefore, it is possible to provide an optical control device capable not only of achieving a velocity matching between the microwave and the optical wave and an impedance matching of the microwaves but also operating at a high speed.

In addition, since the low dielectric constant layer, which has a width larger than that of the signal electrode of the first electrode and is formed over an entire length of the signal electrode, is formed at least on a lower portion of the sheet-like substrate, it is possible to reduce an electrode loss and to increase an optical confinement factor. Accordingly, it is possible to realize a highly efficient modulator capable of coping with a high frequency band. In other words, it is possible to provide an optical control device capable not only of achieving a velocity matching between the microwave and the optical wave and an impedance matching of the microwaves, but also achieving a reduction in driving voltage. Moreover, it is possible to provide the optical control device which can operate stably and suppress a rise in temperature of the optical control device owing to the reduction in driving voltage, and further to provide the optical control device which can use a low-driving-voltage driving device which is inexpensive.

According to the invention of claim 2, since it is possible to dispose the low dielectric constant layer closer to the signal electrode, it is possible more effectively to achieve the above-mentioned electrode loss reduction effect and optical confinement effect. Accordingly, it is possible easily to realize a highly efficient modulator capable of coping with a high frequency band.

According to the invention of claim 3, since it is possible to dispose the low dielectric constant layer closer to the signal electrode, it is possible more effectively to achieve the above-mentioned electrode loss reduction effect and optical confinement effect. Accordingly, it is possible easily to realize a highly efficient modulator capable of coping with a high frequency band.

According to the invention of claim 4, since the low dielectric constant layer is configured by an air layer, the low dielectric constant effect can more effectively be exhibited. Therefore, it is possible more effectively to achieve the above-mentioned electrode loss reduction effect and optical confinement effect. Accordingly, it is possible easily to realize a highly efficient modulator capable of coping with a high frequency band.

According to the invention of claim 5, since the low dielectric constant layer is configured by a resin layer, the low dielectric constant effect can more effectively be exhibited. Therefore, it is possible more effectively to achieve the above-mentioned electrode loss reduction effect and optical confinement effect. Accordingly, it is possible easily to realize a highly efficient modulator capable of coping with a high frequency band.

According to the invention of claim 6, since the optical waveguide is the ridged optical waveguide, an optical confinement factor becomes higher and it is possible to concentrate an electric field generated by the control electrode into the optical waveguide. Therefore, it is possible to realize the optical control device which operates in a lower driving voltage.

According to the invention of claim 7, since the buffer layer is formed at least between the sheet-like substrate and the first electrode, it is possible to dispose the control electrode much closer to the optical waveguide while suppressing a propagation loss of the optical wave propagating through the optical waveguide.

According to the invention of claim 8, since the signal electrode and the ground electrode are configured by either a transparent electrode or an electrode where a transparent electrode is disposed on the sheet-like substrate, it is possible to dispose the control electrode much closer to the optical waveguide while suppressing a propagation loss of the optical wave propagating through the optical waveguide, even when there is no buffer layer.

According to the invention of claim 9, since the low dielectric constant film is filled in recesses which are disposed on at least both sides of the ridged waveguide, it is possible to adjust the refractive index or the impedance of a microwave in the control electrode, and thus a further appropriate refractive index or impedance of the microwave can be obtained.

According to the invention of claim 10, a spontaneous polarization of the sheet-like substrate including at least a portion of the optical waveguide is reversed in the optical control device according to any one of claims 1 to 10. Therefore, a differential driving of the optical control device can easily be realized by a simple control electrode and a driving circuit, and thus it is possible to reduce a driving voltage.

According to the invention of claim 11, the effective voltage applied to the optical waveguide is set so as not to be decreased by ½ or less in the optical control device according to any one of claims 1 to 10. Therefore, it is possible to prevent the effective voltage applied to the optical waveguide section from overly being decreased.

BEST MODE FOR IMPLEMENTING THE INVENTION

Figure 1:
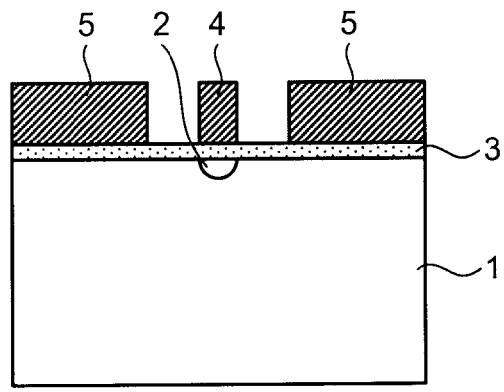
FIG. 1 is a view illustrating an example of a conventional optical control device.
Figure 2:
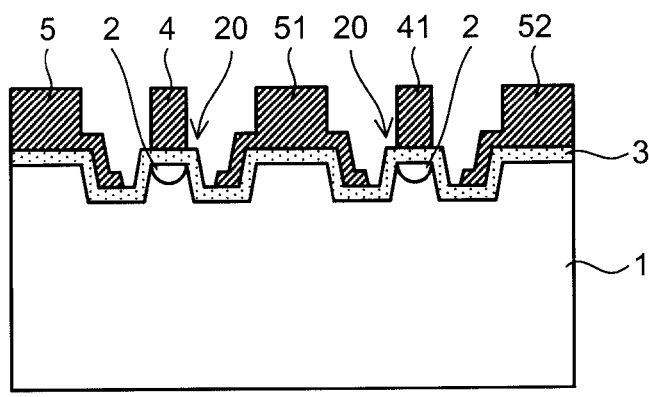
FIG. 2 is a view illustrating an example of the conventional optical control device.
Figure 3:
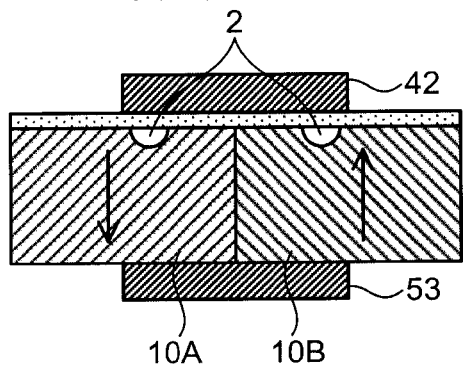
FIG. 3 is a view illustrating an example of the conventional optical control device.
Figure 4:
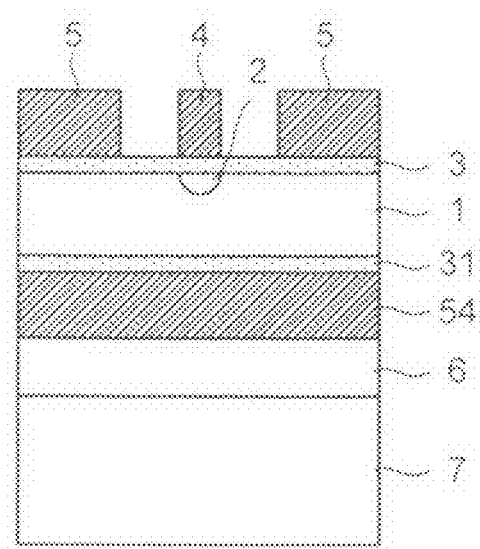
FIG. 4 is a view illustrating an example of an optical control device according to the present invention.

FIG. 4 is a top plan view illustrating an example of an optical control device according to the present invention. In this example, a case where a sheet-like substrate on which an optical waveguide is to be formed is configured by a Z-cut substrate is illustrated, and only a main part of the optical control device is illustrated.

As illustrated in FIG. 4, an optical waveguide 2 is formed in a Z-cut substrate (sheet-like substrate 1) such that control electrodes are disposed so as to interpose the sheet-like substrate 1 therebetween. The control electrodes include a first electrode which is disposed on an upper side of the sheet-like substrate 1 and a second electrode which is disposed on a lower side of the sheet-like substrate 1. The first electrode includes a signal electrode 4 and a ground electrode 5, and the second electrode includes a ground electrode 54. It goes without saying that the first and second electrodes may appropriately include additional necessary electrodes such as a DC electrode other than the illustrated electrodes. Moreover, as the optical waveguide, a straight waveguide or a Mach-Zehnder type optical waveguide incorporating therein a straight waveguide may be used.

The optical control device illustrated in FIG. 4 is characterized in that not only an electric field through the signal electrode 4 and the ground electrode 5, but also an electric field through the signal electrode 4 and the ground electrode 54 are applied to the optical waveguide 2. According to this configuration, it is possible to increase the intensity of the electric field in a vertical direction of the optical waveguide 2 illustrated in the drawing, and thus to reduce the driving voltage. Moreover, since a refractive index and an impedance of a microwave in the control electrode are determined by the signal electrode 4 and the ground electrodes 5 and 54, it is possible to set the impedance value to 50Ω while realizing a refractive index of 2.14 that is an optimal value for the microwave, for example.

The first electrode is disposed via a buffer layer 3 such as a $SiO_2$ film which is disposed between the first electrode and the sheet-like substrate 1. The buffer layer has an effect that prevents optical waves propagating in the optical waveguide from being absorbed or scattered by the control electrode. In addition, as a configuration of the buffer layer, a Si film or the like can also be formed integrally if necessary in order to reduce the pyroelectric effect of the sheet-like substrate 1.

Moreover, the second electrode (the ground electrode 54) is disposed on the sheet-like substrate 1 via a low dielectric constant layer 31 which has a width larger than that of the signal electrode 4 of the first electrode and is formed over the entire length of the signal electrode 4. Therefore, it is possible to reduce an electrode loss and to increase an optical confinement factor. Accordingly, it is possible to realize a highly efficient modulator capable of coping with a high frequency band.

In other words, according to the optical control device of the present embodiment, it is possible to provide an optical control device capable not only of achieving a velocity matching between the microwave and the optical wave and an impedance matching of the microwaves, but also achieving a reduction in driving voltage. Moreover, it is possible to provide the optical control device which can operate stably and suppress a rise in temperature of the optical control device owing to the reduction in driving voltage, and further to provide the optical control device which can use a low-driving-voltage driving device which is inexpensive.

The low dielectric constant layer 31 may be formed of an air layer or a resin layer of teflon (registered trademark), for example.

In the present embodiment, the thickness of the sheet-like substrate 1 is 10 μm or less so that not only the electric field in the signal electrode 4 and the ground electrode 5, but also the electric field in the signal electrode 4 and the ground electrode 54 can sufficiently be applied to the optical waveguide 2. Although the lower limit of the thickness of the sheet-like substrate 1 is not limited, the thickness is set to 0.7 μm, for example. If the sheet-like substrate is thinner than 0.7 μm, it is difficult to form the optical waveguide 2 having a sufficient size.

The sheet-like substrate 1 is bonded to the supporting substrate 7 via an adhesive layer 6 after the second electrode is formed. Therefore, even when the thickness of the sheet-like substrate 1 is 10 μm or less, it is possible to secure a sufficient mechanical strength for the optical control device.

Figure 5:
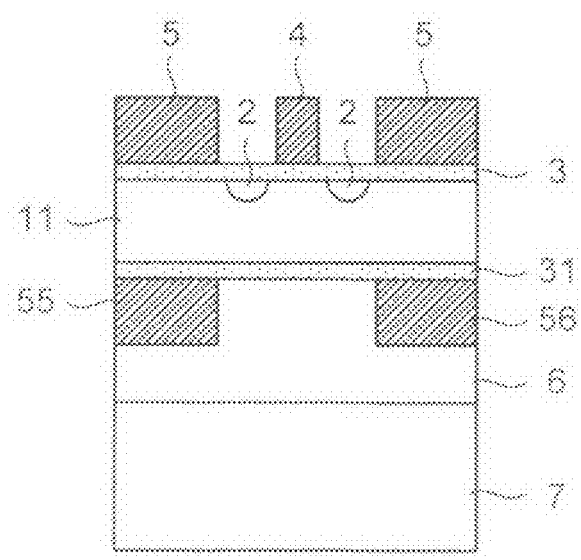
FIG. 5 is a view illustrating an example of an optical control device according to the present invention.

FIG. 5 illustrates an example of where an X-cut substrate is used, specifically where an X-cut $LiNbO_3$ substrate is used, in which the direction of the higher efficiency of the electro-optical effect is high corresponds to a horizontal direction in the drawing. For this reason, the signal electrode 4 and the ground electrode 5 are disposed in the first electrode at such a position as interposing the optical waveguide 2, and in the second electrode, the shape and arrangement of the ground electrodes 55 and 56 are determined such that the electric field formed by the signal electrode 4 and the ground electrodes 55 and 56 has a horizontal component with respect to the optical waveguide 2. As will later be described, by configuring the second electrode as a patterned electrode commensurate with the shape of the optical waveguide, it is possible to form greater optimum electric field distribution.

In the case of the example illustrated in FIG. 5, the second electrode (the ground electrodes 55 and 56) is disposed on the sheet-like substrate 1 via the low dielectric constant layer 31 which has a width larger than that of the signal electrode 4 of the first electrode and is formed over the entire length of the signal electrode 4. Therefore, it is possible to reduce an electrode loss and to increase an optical confinement factor. Accordingly, it is possible to realize a highly efficient modulator capable of coping with a high frequency band. The low dielectric constant layer 31 may be formed of an air layer or a resin layer of teflon (registered trademark), for example.

In the present embodiment, the thickness of the sheet-like substrate 1 is 10 μm or less so that not only the electric field through the signal electrode 4 and the ground electrode 5, but also the electric field through the signal electrode 4 and the ground electrode 54 can sufficiently be applied to the optical waveguide 2. Although the lower limit of the thickness of the sheet-like substrate 1 is not limited, the thickness is set to 0.7 μm, for example. If the sheet-like substrate is thinner than this, it is difficult to form the optical waveguide 2 having a sufficient size.

As a crystalline substrate having an electro-optical effect used for the sheet-like substrate, lithium niobate, lithium tantalite, PLZT (lead lanthanum zirconate titanate), or quartz-based material, or a combination of these materials can be used, for example. It is particularly preferable to use crystals of lithium niobate (LN) or lithium tantalite (LT) due to their high electro-optical effect.

As a method of manufacturing the optical waveguide, it is possible to form the optical waveguide by diffusing Ti or the like into a substrate surface through a thermal diffusion method or a proton-exchange method. In addition, as described in Patent Document 5, it is possible to form the optical waveguide by forming a ridge structure on the surface of the sheet-like substrate 1 in accordance with the shape of the optical waveguide.

The control electrode such as the signal electrode or the ground electrode can be formed through the formation of an electrode pattern of Ti/Au and a plated gold film, etc. In addition, for a transparent electrode to be described later, ITO or a compound oxide film of In and Ti which is an infrared-transparent conductive film is available. Further, the transparent electrode can be formed through the formation of an electrode pattern using photolithography technique and then using lift-off technique, or the formation of an electrode pattern using a mask member commensurate with the shape of the electrode pattern and then using dry etching or wet etching (see Patent Document 5).

In a method of manufacturing the sheet-like substrate 1 including the optical control device, the above-mentioned optical waveguide is formed on a substrate having a thickness of several hundreds μm, and a rear surface of the substrate is polished, so that the sheet-like substrate having a thickness of 10 μm or less is prepared. Thereafter, a control electrode is formed on a top surface of the sheet-like substrate. Alternatively, it is also possible to polish the rear surface of the substrate after forming the optical waveguide, the control electrode and the like. There may be a risk of damage to the sheet-like substrate when the sheet-like substrate undergoes a thermal impact during the formation of the optical waveguide or a mechanical impact due to handling of the sheet-like film during various processes. Therefore, it is preferable that a process that is likely to involve these thermal or mechanical impacts is performed before the substrate is polished to obtain the sheet-like substrate.

Various materials can be used for the supporting substrate 7. For example, in addition to using the same material as the sheet-like substrate, it is possible to use materials having a lower dielectric constant than the sheet-like substrate, such as quartz, glass, or alumina, or materials having a different crystal orientation from the sheet-like substrate. However, in order to stabilize the modulation characteristics of the optical control device with respect to temperature variation, it is preferable to select and use materials having a linear expansion coefficient equivalent to that of the sheet-like substrate. To the contrary, in a case where it is difficult to select the equivalent material, a material having a linear expansion coefficient equivalent to that of the sheet-like substrate is selected and used for an adhesive for bonding the sheet-like substrate and the supporting substrate.

The sheet-like substrate 1 and the supporting substrate 7 may be bonded by using various adhesive materials as the adhesive layer 6, such as epoxy-based adhesive, thermosetting adhesive, ultraviolet curable adhesive, solder glass, or a thermosetting, a light curable or a light-induced viscosity resin adhesive sheet.

Figure 6:
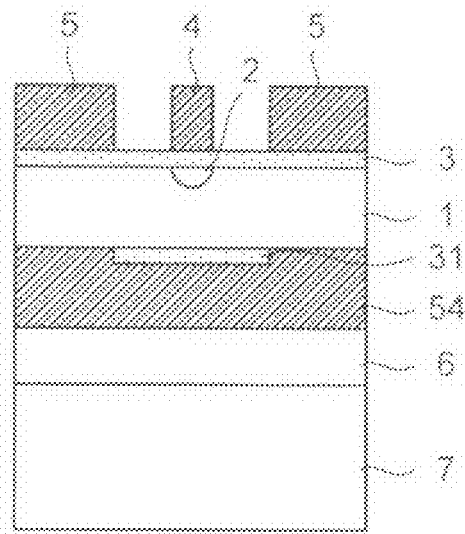
FIG. 6 is a view illustrating a modified example of the optical control device illustrated in FIG. 4.

FIG. 6 is a cross-sectional view illustrating a main part of a modified example of the optical control device illustrated in FIG. 4. The present embodiment is different from the embodiment illustrated in FIG. 4, in that the low dielectric constant layer 31 is embedded in the second electrode (the ground electrode). However, even in such a case, since the second electrode (the ground electrode 54) is disposed on the sheet-like substrate 1 via the low dielectric constant layer 31 which has a width larger than that of the signal electrode 4 of the first electrode and is formed over the entire length of the signal electrode 4. Therefore, it is possible to reduce an electrode loss and to increase an optical confinement factor. Accordingly, it is possible to realize a highly efficient modulator capable of coping with a high frequency band.

In other words, according to the optical control device of the present embodiment, it is possible to provide an optical control device capable not only of achieving a velocity matching between the microwave and the optical wave and an impedance matching of the microwaves, but also achieving a reduction in driving voltage. Moreover, it is possible to provide the optical control device which can operate stably and suppress a rise in temperature of the optical control device owing to the reduction in driving voltage, and further to provide the optical control device which can use a low-driving-voltage driving device which is inexpensive. The low dielectric constant layer 31 may be formed of an air layer or a resin layer of teflon (registered trademark), for example.

The thickness of the low dielectric constant layer is preferably adjusted so that the effective voltage applied to the optical waveguide section is prevented from overly being decreased. In the present embodiment, the effective voltage applied to the optical waveguide is set so as not to be decreased by ½ or less.

$$d2 < \in_2 / \in_1 \times d1$$

Here, $\in_2$ is a dielectric constant of the low dielectric constant layer, d2 is a thickness of the low dielectric constant layer, $\in_1$ is a dielectric constant of the sheet-like substrate 1, and d1 is a thickness of the sheet-like substrate 1. For example, when the low dielectric constant layer is configured by an air layer ($\in_2 = 1$), d1 is set to 10 μm, and the sheet-like substrate 1 is configured by a LiNbO$_3$ substrate, the thickness d2 of the low dielectric constant layer may be set to 0.36 μm.

In addition, other constituent elements and the requirements for these constituent elements are the same as those of the embodiment of FIG. 4.

Hereinafter, applications of the optical control device according to the present invention will be described. In the following drawings, when the same members as the above-mentioned members are used, they are referenced by the same reference numeral if possible, and the adhesive layer or the supporting substrate is omitted, as necessary, in order to describe characteristics of the configuration clearly. Moreover, in order to prevent the description from becoming redundant, the applications of the embodiments illustrated in FIG. 4 will be mainly described.

(Optical Control Device Using Ridged Waveguide)

Figure 7:
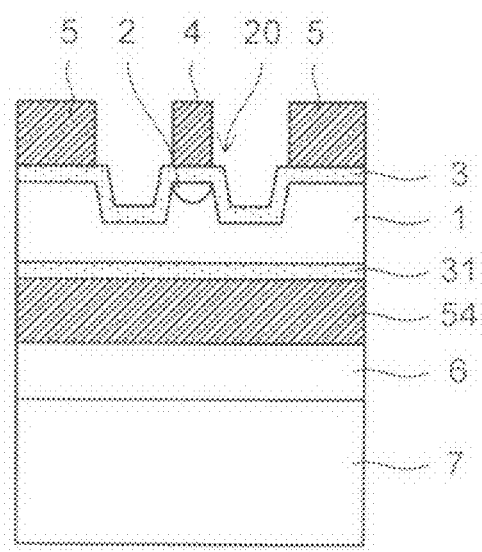
FIG. 7 is a view illustrating an example of a ridge-type optical control device according to the present invention.
Figure 8:
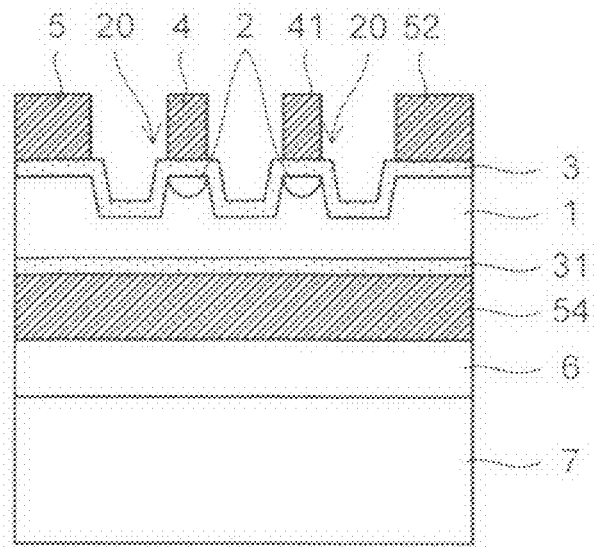
FIG. 8 is a view illustrating an example of a ridge-type optical control device according to the present invention.
Figure 9:
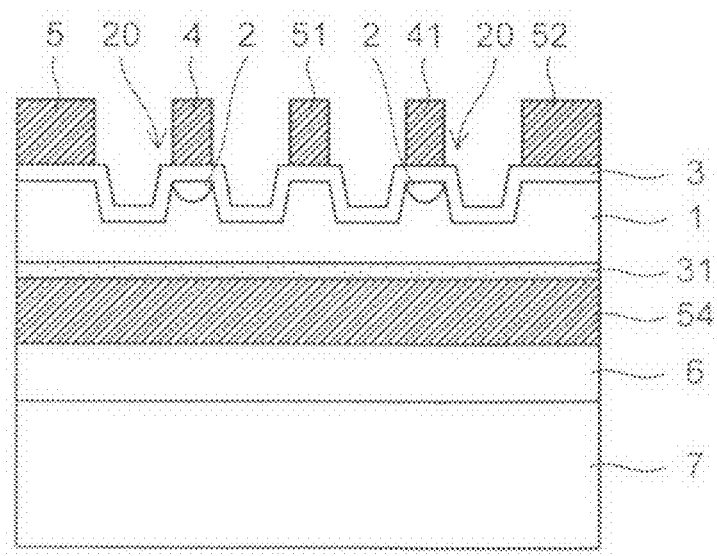
FIG. 9 is a view illustrating an example of a ridge-type optical control device according to the present invention.

FIGS. 7 to 9 illustrate an application of the optical control device illustrated in FIG. 4, which is an example of where the optical waveguide is formed by a ridged waveguide. Since the optical waveguide is formed as the ridged optical waveguide, an optical confinement factor becomes higher and it is possible to concentrate an electric field generated by the control electrode into the optical waveguide. Therefore, it is possible to realize the optical control device which operates in a lower driving voltage.

As illustrated in FIG. 7, the optical waveguide of the optical control device is formed by a ridged waveguide 20, whereby the optical wave propagating through the optical waveguide is confined in the ridge portion 20. Since the electric field generated by the signal electrode 4 and the ground electrode 5 and the electric field generated by the signal electrode 4 and the ground electrode 54 are intensively applied to the ridge portion 20, leading to the contribution to a reduction in driving transmission of the optical control device.

FIG. 8 illustrates that two optical waveguides 2 are formed as ridged waveguides 20. The signal electrodes 4 and 41 are disposed so as to correspond to the ridged waveguides, and signals of opposite directions are applied to the signal electrodes. For example, as an attention is paied to the left ridge portion 20, the electric field generated by the signal electrode 4 and the ground electrode 5, the electric field generated by the signal electrode 4 and the ground electrode 54, and further the electric field generated by the signal electrode 4 and the signal electrode 41 are intensively applied to the left ridge portion 20.

FIG. 9 illustrates that two optical waveguides 2 are formed as the ridged waveguides 20, and a ridge portion corresponding to the ground electrode 51 is formed between the two optical waveguides. The signal electrodes 4 and 41 are disposed so as to correspond to the ridged waveguides 20, and independent signals are applied to the signal electrodes.

For example, when an attention is paied to the left ridge portion 20, the electric field generated by the signal electrode 4 and the ground electrode 5, the electric field generated by the signal electrode 4 and the ground electrode 54, and further the electric field generated by the signal electrode 4 and the ground electrode 51 are intensively applied to the left ridge portion 20.

(Optical Control Device Having Low Dielectric Constant Film)

Figure 10:
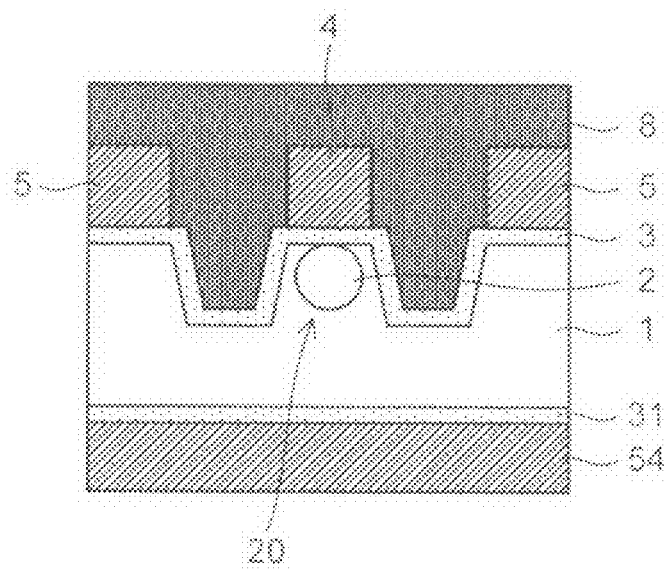
FIG. 10 is a view illustrating an example of an optical control device having a low dielectric constant film.
Figure 11:
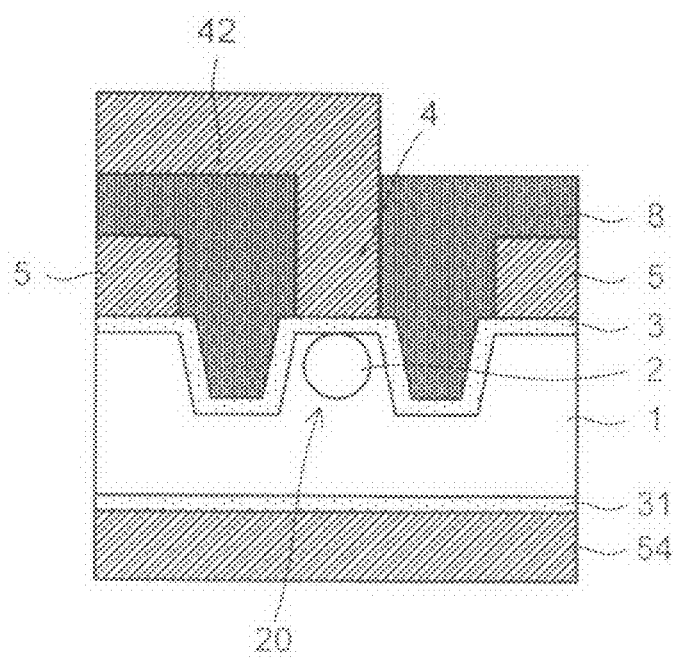
FIG. 11 is a view illustrating an example of an optical control device having a low dielectric constant film.

FIGS. 10 and 11 illustrate another application of the optical control device illustrated in FIG. 4, which is an example of where a low dielectric constant film is disposed in a recess that forms the ridged waveguide and between the signal electrode 4 and the ground electrode 5 which constitute the first electrode. With this arrangement of the low dielectric constant film, it is possible to adjust the refractive index or the impedance of a microwave in the control electrode, and to increase the degree of flexibility in wiring of the control electrode.

As materials of the low dielectric constant film, benzocyclobutene (BCB) or the like can be used, and as a method of manufacturing the low dielectric constant film, a coating method can be used.

As illustrated in FIG. 10, a low dielectric constant film 8 can be formed so as to cover recesses formed on both sides of the ridged waveguide 20, portions between the signal electrode 4 and the ground electrode 5, or the first electrode.

In addition, as illustrated in FIG. 11, a power feeding portion 42 of the signal electrode 4 is disposed across a portion of the ground electrode 5, and the low dielectric constant film 8 is disposed between the ground electrode 4 and the power feeding portion 42. Therefore, the control electrode can be wired in three dimensions, and thus the degree of flexibility in wiring design related to the control electrode can be increased. Moreover, the ground electrode may be formed so as to pass through a position above the signal electrode (location away from the sheet-like substrate).

(Optical Control Device where Optical Waveguide is Formed on Rear Surface Side of the Sheet-Like Substrate)

Figure 12:
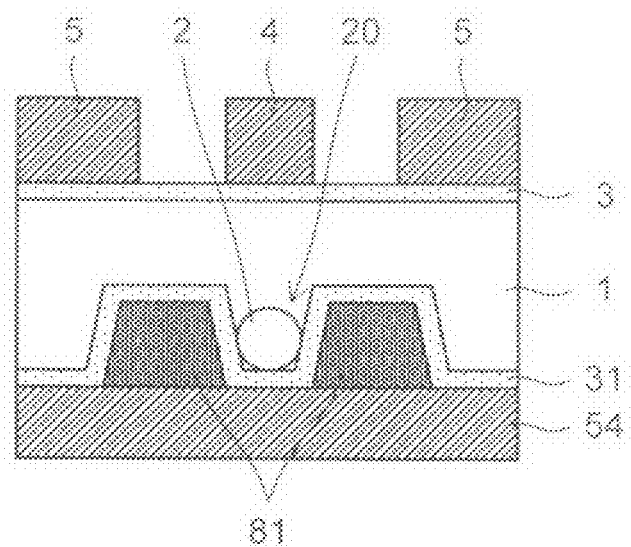
FIG. 12 is a view illustrating an example of an optical control device where an optical waveguide is formed on a rear surface side of a sheet-like substrate.
Figure 13:
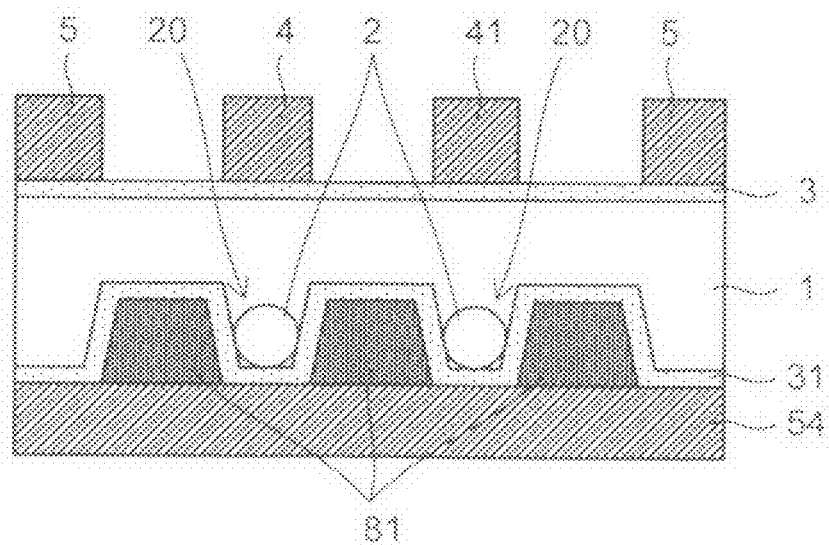
FIG. 13 is a view illustrating an example of an optical control device where an optical waveguide is formed on a rear surface side of a sheet-like substrate.

FIGS. 12 and 13 illustrate a further application of the optical control device illustrated in FIG. 4, which is an example of where the optical waveguide 2 (the ridged waveguide 20) is formed on the rear surface (the lower side in the drawing) of the sheet-like substrate 1. When the sheet-like substrate having a thickness of 10 μm or less is used, as illustrated in FIG. 12, the optical waveguide 2 is formed on the rear surface of the sheet-like substrate 1, and the signal electrode 4 and the ground electrode 5, which are the first electrode, are formed on the top surface of the sheet-like substrate. Further, even though the ground electrode 54, which is the second electrode, is formed on the rear surface of the sheet-like substrate 1, it is possible to apply an electric field, especially, the electric field generated by the signal electrode 4 and the ground electrode 54, to the ridge portion 20.

FIG. 13 illustrates an example of where two signal electrodes 4 and 41 are used, in which the left ridge portion 20 is applied with the electric field generated by the signal electrode 4 and the ground electrode 54, and the right ridge portion 20 is applied with the electric field generated by the signal electrode 41 and the ground electrode 54.

In addition, a low dielectric constant film 81 may be formed in the recesses which form the ridge portions 20, if necessary.

In the case of the optical control device illustrated in FIGS. 7 to 9, it is necessary-accurately to arrange the signal electrode 4 or 41 on the top of the ridge portion of the ridged waveguide. However, in the case of the optical control device illustrated in FIGS. 12 and 13, it is possible to provide an advantage that the electric field effectively can be applied to the ridge portion only by setting the width of the signal electrode 4 or 41 to be equal to or larger than that of the ridged waveguide, even when a small positional deviation occurs between them.

(Optical Control Device Using Transparent Electrode)

Figure 14:
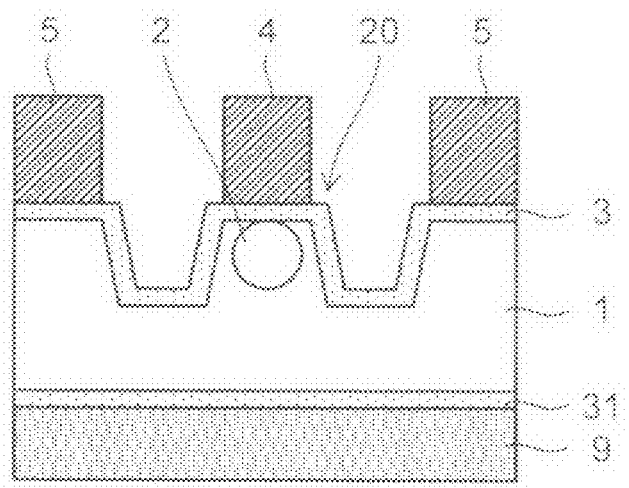
FIG. 14 is a view illustrating an example of an optical control device that uses a transparent electrode.
Figure 15:
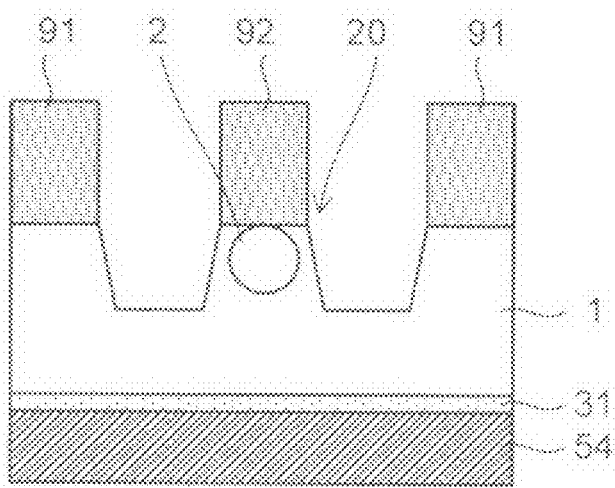
FIG. 15 is a view illustrating an example of an optical control device that uses a transparent electrode.
Figure 16:
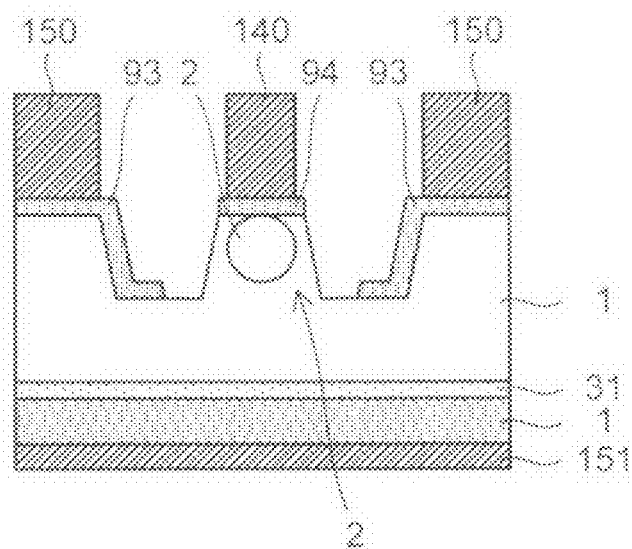
FIG. 16 is a view illustrating an example of an optical control device that uses a transparent electrode.

FIGS. 14 to 16 illustrate still a further application of the optical control device illustrated in FIG. 4, which is an example of where transparent electrodes 9 and 91 to 94 are used as the electrode. By using either a transparent electrode or an electrode where a transparent electrode is disposed on the sheet-like substrate as the signal electrode or the ground electrode, it is possible to dispose the control electrode much closer to the optical waveguide and to reduce the driving voltage while suppressing a propagation loss of the optical wave propagating through the optical waveguide, even when there is no buffer layer.

FIG. 14 illustrates an example of where a transparent electrode 9 is used as the ground electrode of the second electrode, and FIG. 15 illustrates an example of where transparent electrodes 91 and 92 are used as the first electrode. In these cases, a buffer layer 3 illustrated in FIG. 14 is not necessary, and it is possible to dispose the electrode closer to the optical waveguide. In addition, the ground electrode (the transparent electrode 91) constituting the first electrode illustrated in FIG. 15 may be formed by a general metal electrode because there is no optical waveguide in the vicinity of the electrode.

FIG. 16 illustrates an example of where the transparent electrode is used in a part (a side being in contact with the sheet-like substrate 1 or 11) of the control electrode. In general, since the transparent electrode has a high electrical resistivity compared to the metal electrode of Au or the like, it is possible to dispose the metal electrodes 140, 150, and 151 so as to be in contact with the transparent electrodes 9 or 93 to 96 for the purpose of reducing an electrical resistance of an electrode. In addition, it is also possible to dispose the transparent electrode close to the ridged waveguide or on a side surface of the ridged optical waveguide as illustrated by reference numeral 93 or 95 and 96, and to allow the electric field to act on the waveguide extremely effectively.

Figure 17:
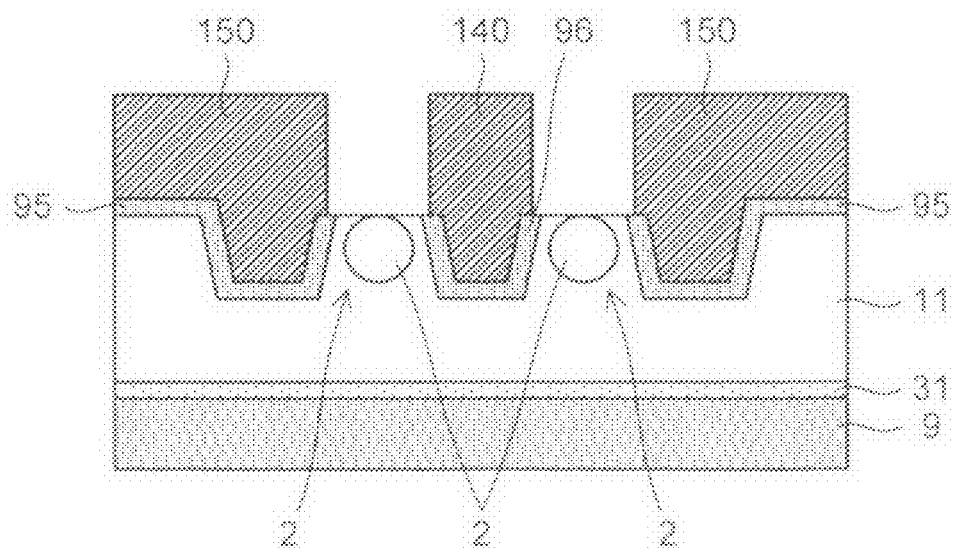
FIG. 17 is a view illustrating an example of an optical control device that uses a transparent electrode.

Although FIG. 16 illustrates an example of where a Z-cut LN substrate is used as the sheet-like substrate, FIG. 17 illustrates an example of where an X-cut LN substrate is used as the sheet-like substrate, for the purpose of reference. The same reference numerals denote the same members, and the same operational effects as those of the case illustrated in FIG. 16 can be obtained.

(Optical Control Device Using Patterned Electrode as Second Electrode)

Figure 18:
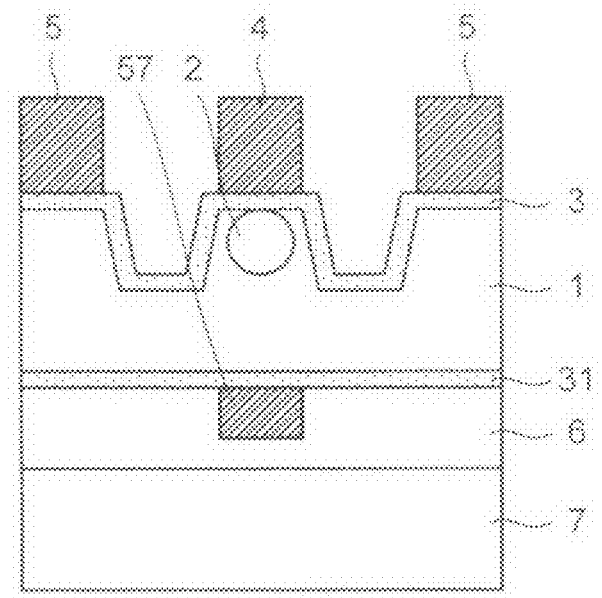
FIG. 18 is a view illustrating an example of an optical control device where a patterned electrode is used as a second electrode.

FIG. 18 illustrates another application of the optical control device illustrated in FIG. 4, which is an example of where the ground electrode that forms the second electrode is formed as a patterned electrode. Since the second electrode is formed as the patterned electrode which has a shape corresponding to the shape of the optical waveguide, it is possible to adjust the shape of the electric field applied to the optical waveguide to a more appropriate shape, and to reduce the driving voltage much more.

Figure 19:
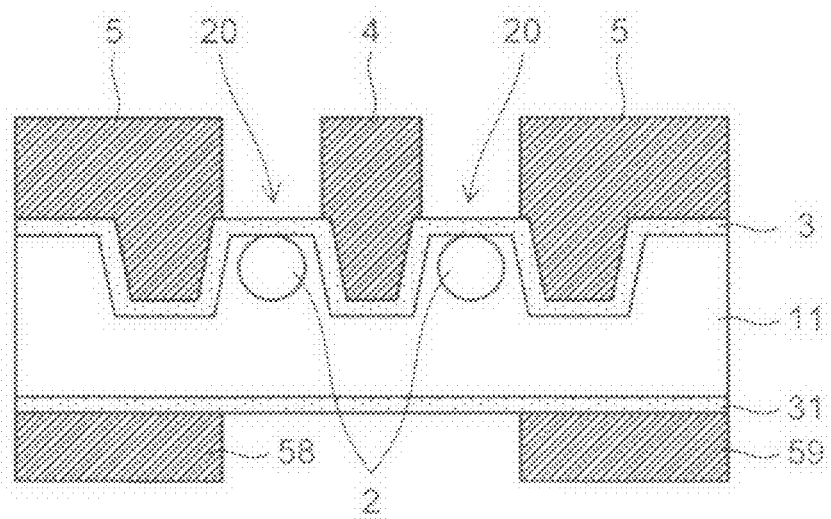
FIG. 19 is a view illustrating an example of an optical control device where a patterned electrode is used as a second electrode.

In FIG. 18, the ground electrode 57 is formed as an electrode having a strip shape that extends along the optical waveguide 2 so that the electric field generated by the signal electrode 4 and the ground electrode 57 further is concentrated into the optical waveguide 2. Although FIG. 18 illustrates an example of where a Z-cut substrate is used as the sheet-like substrate, FIG. 19 illustrates an example of where an X-cut substrate is used as the sheet-like substrate, for the purpose of reference. The same reference numerals denote the same members, and the same operational effects as those of the case illustrated in FIG. 18 can be obtained.

(Optical Control Device Using Polarization Reversal)

Figure 20:
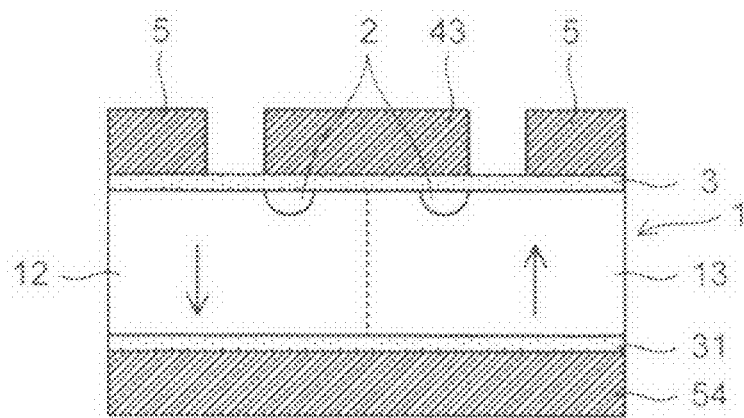
FIG. 20 is a view illustrating an example of an optical control device that uses a polarization reversal.
Figure 21:
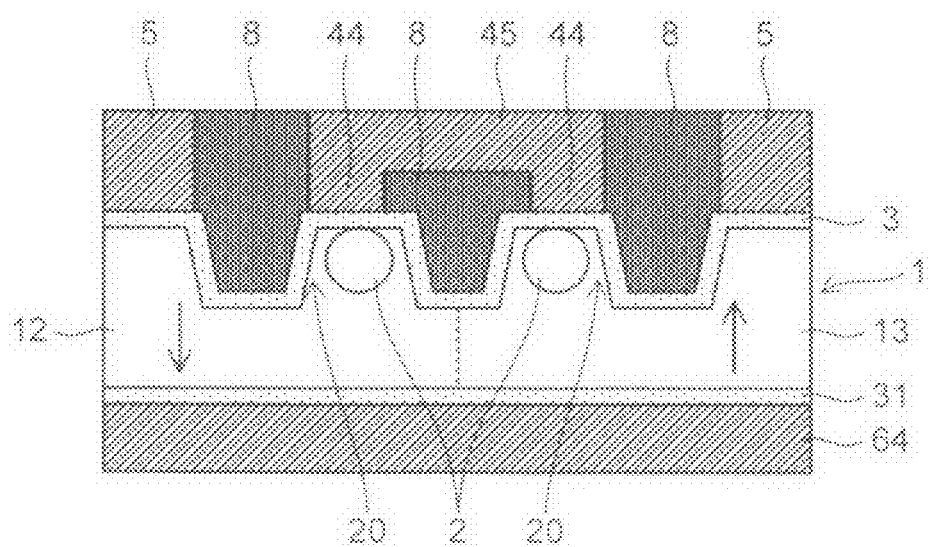
FIG. 21 is a view illustrating an example of an optical control device that uses a polarization reversal.

FIGS. 20 and 21 illustrate a further application of the optical control device illustrated in FIG. 4, which is an example of where the sheet-like substrate 1 is polarized reversely. Since the spontaneous polarization of the sheet-like substrate 1 including at least a portion of the optical waveguide is reversed, a differential driving of the optical control device can easily be realized by a simple control electrode or a driving circuit, and thus it is also possible to reduce the driving voltage.

In FIG. 20, the spontaneous polarizations are generated so that in the sheet-like substrate 1, the polarization direction in the region 12 is opposite to the polarization direction in the region 13 (indicated by arrows in the drawing). The signal electrode 43 constituting the first electrode is able to apply a common electric field to the optical waveguides 2 which are formed in the substrate regions 12 and 13. Since the directions of polarization in the substrates are different from each other in the respective optical waveguides, a phase change in the optical waves propagating in the optical waveguides is reversed each other and, as a result, it is possible to obtain the same effect as that in the differential driving.

FIG. 21 illustrates an example of where the directions of polarization in the substrate regions 12 and 13 of the sheet-like substrate 1 are adjusted to be different each other, and a ridged optical waveguide is used. The same signal electrodes 44 are used for applying the electric field to the two ridged waveguides 20, and the two signal electrodes 44 are electrically connected by a connection path 45. Moreover, the low dielectric constant film 8 is formed in the recesses that form the ridged waveguides or between the signal electrode and the ground electrode 5.

(Optical Control Device Using Through-Hole)

Figure 22:
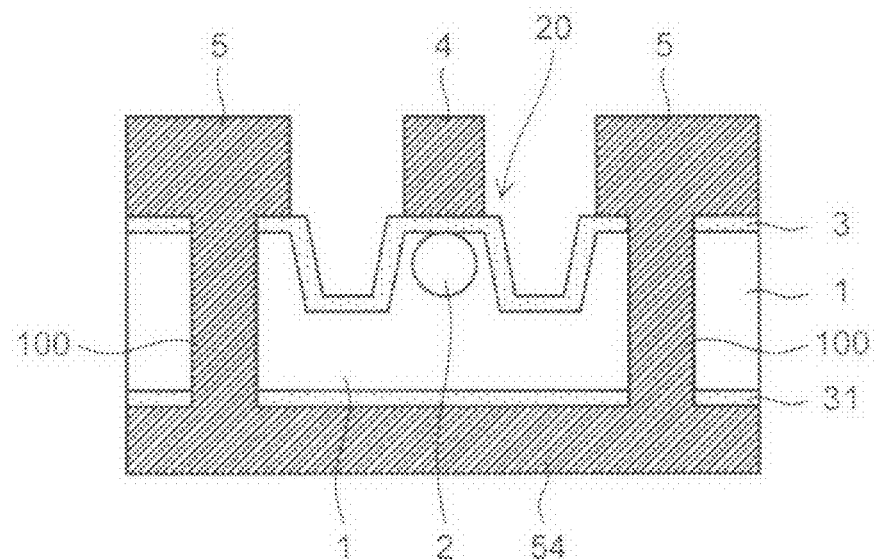
FIG. 22 is a view illustrating an example of an optical control device that uses a through-hole.

FIG. 22 illustrates an application of the optical control device of the present invention, which is an example of where a through-hole is used for electrically connecting the ground electrode of the first electrode with the ground electrode of the second electrode. The ground electrode of the first electrode and the ground electrode of the second electrode are electrically connected to each other via the through-hole provided in the sheet-like substrate. Therefore, it is not only possible to simplify an electric wiring for the optical control device, but also to suppress a variation in floating charges which is generated in the ground electrode of the first electrode and the ground electrode of the second electrode. Accordingly, it is possible to apply a more appropriate electric field to the optical waveguide.

FIG. 22 illustrates an example using a Z-cut LN sheet-like substrate 1, where the ground electrode 5 of the first electrode and the ground electrode 54 of the second electrode are kept in an electrical conduction state by a connection path 100 which is disposed in the through-hole of the sheet-like substrate 1. The ground electrode of the first electrode and the ground electrode of the second electrode illustrated in FIGS. 2 to 8 electrically are connected to each other in the vicinity or at the outside of the sheet-like substrate. However, as the frequency of the modulation signal applied to the control electrode increases, a deviation in timing is likely to occur in floating charges which are induced in the ground electrode. For this reason, as illustrated in FIG. 22, it is possible to suppress the deviation in timing by electrically connecting both ground electrodes in the vicinity of the optical waveguide.

Figure 23:
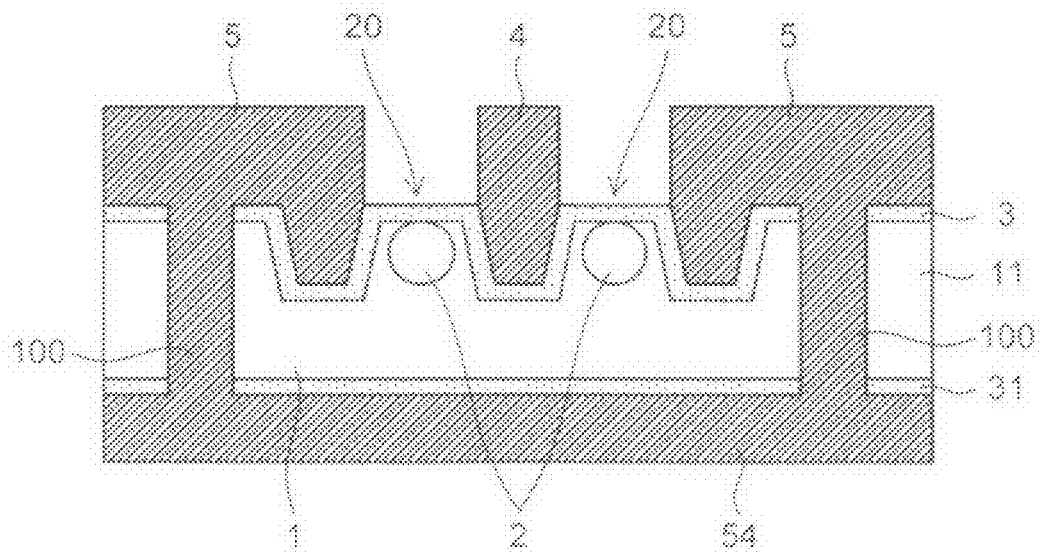
FIG. 23 is a view illustrating an example of an optical control device that uses a through-hole.

Although FIG. 22 illustrates an example of where a Z-cut LN substrate is used as the sheet-like substrate, FIG. 23 illustrates an example of where an X-cut substrate is used as the sheet-like substrate. The same reference numerals denote the same members, and the same operational effects as those of the case illustrated in FIG. 22 can be obtained.

Industrial Applicability

According to the optical control device of the present invention, it is possible to provide an optical control device capable not only of achieving a velocity matching between the microwave and the optical wave and an impedance matching of the microwaves, but also achieving a reduction in driving voltage. Moreover, it is possible to provide the optical control device which can operate stably and suppress a rise in temperature of the optical control device owing to the reduction in driving voltage, and further to provide the optical control device which can use a low-driving-voltage driving device which is inexpensive.

The invention claimed is:

1. An optical control device, comprising:
   a sheet-like substrate which has an electro-optical effect and has a thickness of 10 μm or less;
   an optical waveguide formed on the sheet-like substrate; and
   a control electrode for controlling light passing through the optical waveguide,
   wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode so that an electric field is applied to the optical waveguide by the signal electrode of the first electrode and the ground electrode of the second electrode;
   wherein a low dielectric constant layer, which has a width at least larger than that of the signal electrode of the first electrode and is formed at least over an entire length of the signal electrode, is formed between the sheet-like substrate and the second electrode; and
   wherein a relation of $d2 < \epsilon_2/\epsilon_1 \times d1$ is satisfied, where $\epsilon_2$ is a dielectric constant of the low dielectric constant layer, $d2$ is a thickness of the low dielectric constant layer, $\epsilon_1$ is a dielectric constant of the sheet-like substrate, and $d1$ is a thickness of the sheet-like substrate.

2. The optical control device according to claim 1, wherein the low dielectric constant layer is uniformly formed between the sheet-like substrate and the second electrode.

3. The optical control device according to claim 1, wherein the low dielectric constant layer is formed to be embedded in the ground electrode of the second electrode so that a surface thereof comes into contact with the sheet-like substrate.

4. The optical control device according to claim 1, wherein the low dielectric constant layer includes an air layer which is formed on a lower portion of the signal electrode of the first electrode.

5. The optical control device according to claim 1, wherein the low dielectric constant layer includes a resin layer.

6. The optical control device according to claim 1, wherein a buffer layer is formed at least between the sheet-like substrate and the first electrode.

7. The optical control device according to claim 1, wherein the optical waveguide is composed of two optical waveguides, and a spontaneous polarization is reversed in an optical waveguide region of the sheet-like substrate to which one of the optical waveguides belongs.

8. The optical control device according to claim 1, wherein in the first electrode and the second electrode, the signal electrode and the ground electrode are configured by either a transparent electrode or an electrode where a transparent electrode is disposed on the sheet-like substrate.

9. An optical control device comprising:
   a sheet-like substrate which has an electro-optical effect and has a thickness of 10 μm or less;
   an optical waveguide formed on the sheet-like substrate; and configured as a ridged optical waveguide;
   a control electrode for controlling light passing through the optical waveguide,
   wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode so that an electric field is applied to the optical waveguide of the signal electrode of the first electrode and the ground electrode of the second electrode;

wherein a low dielectric constant layer, which has a width at least larger than that of the signal electrode of the first electrode and is formed at least over an entire length of the signal electrode, is formed on a lower portion of the sheet-like substrate and the second electrode, wherein a relation of $d2 < \in_2/\in_1 \times d1$ is satisfied, where $\in_2$ is a dielectric constant of the low dielectric constant layer, $d2$ is a thickness of the low dielectric constant layer, $\in_1$ is a dielectric constant of the sheet-like substrate, and $d1$ is a thickness of the sheet-like substrate.

10. The optical control device according to claim 9, wherein the low dielectric constant is uniformly formed between the sheet-like substrate and the second electrode.

11. The optical control device according to claim 9, wherein the low dielectric constant layer is formed to be embedded in the ground electrode of the second electrode so that a surface thereof comes into contact with the sheet-like substrate.

12. The optical control device according to claim 9, wherein the low dielectric constant layer includes an air layer which is formed on a lower portion of the signal electrode of the first electrode.

13. The optical control device according to claim 9, wherein the low dielectric constant layer includes a resin layer.

14. The optical control device according to claim 9, wherein a low dielectric constant film is filled in recesses which are disposed on at least both sides of the ridged waveguide.

15. The optical control device according to claim 9, wherein a buffer layer is formed at least between the sheet-like substrate and the first electrode.

16. The optical control device according to claim 9, wherein the optical waveguide is composed of two optical waveguides, and a spontaneous polarization is reversed in an optical waveguide region of the sheet-like substrate to which one of the optical waveguides belongs.

17. The optical control device according to claim 9, wherein in the first electrode and the second electrode, the signal electrode and the ground electrode are configured by either a transparent electrode or an electrode where a transparent electrode is disposed on the sheet-like substrate.

* * * * *